United States Patent Office 3,679,616
Patented July 25, 1972

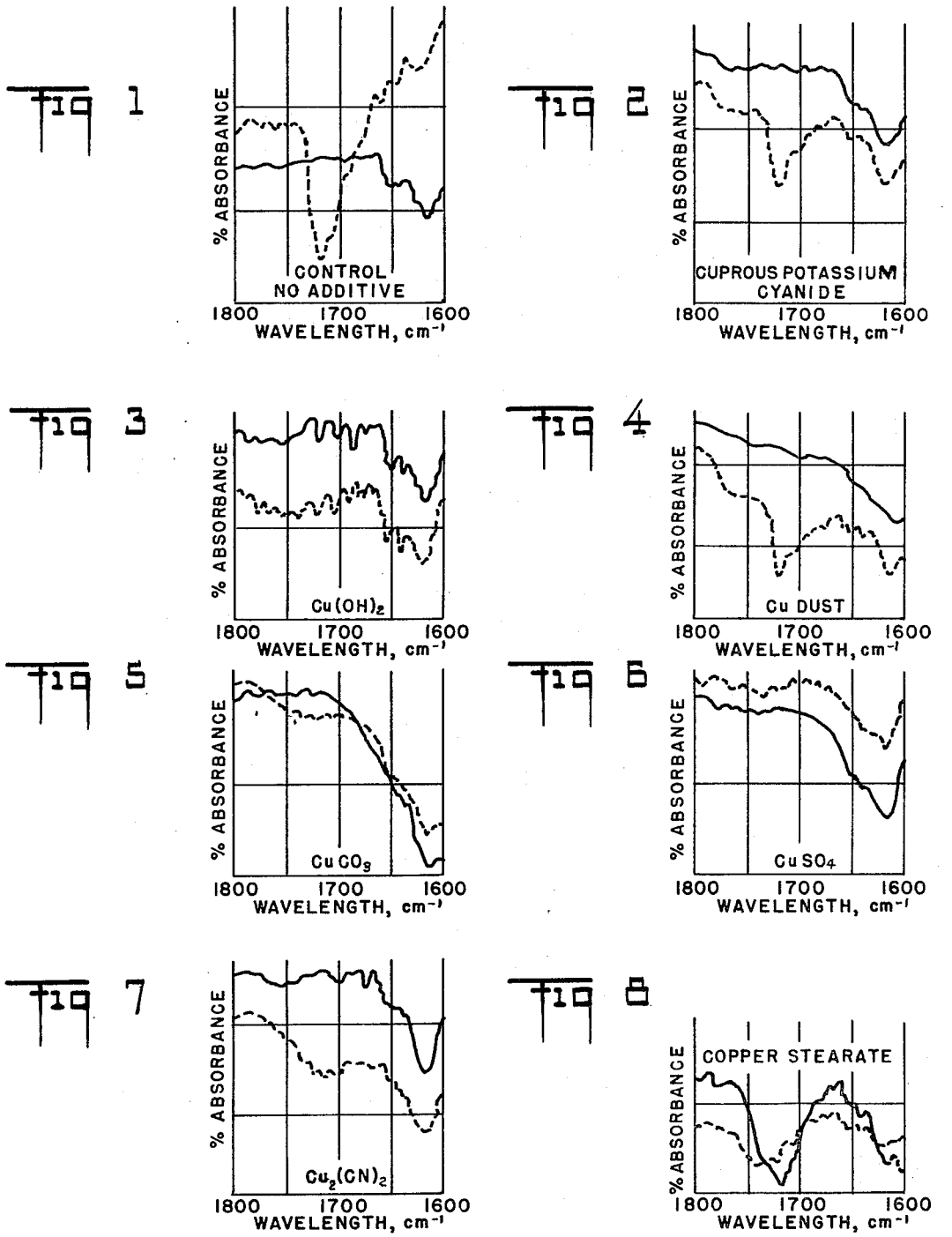

3,679,616
METHOD OF MAKING ETHYLENE SULFIDE POLYMERS BY ADDITION OF STABILIZERS TO REACTION MIXTURE PRIOR TO POLYMERIZATION
Jose L. Villa, Heightstown, N.J., assignor to Thiokol Chemical Corporation, Bristol, Pa.
Filed July 30, 1970, Ser. No. 59,525
Int. Cl. C08g 23/00
U.S. Cl. 260—18 R                  14 Claims

ABSTRACT OF THE DISCLOSURE

Ethylene sulfide polymers are stabilized against oxidative degradation by incorporating therein a small amount of finely divided copper or a copper salt essentially insoluble in and inert toward ethylene sulfide monomer. Representative copper salts are cuprous potassium cyanide, cupric hydroxide, cuprous cyanide, cupric carbonate, cupric sulfate and copper stearate. The stabilizing agent is incorporated in the polymerization mixture prior to polymerization. Known thermal stabilizing agents may be added to the polymer to improve its overall stability.

---

This invention relates generally to high molecular weight, thermoplastic, moldable ethylene sulfide polymers and more particularly to polymers of this type having improved stability against oxidative degradation, as well as to a novel method of making such polymers.

In recent years high molecular weight, thermoplastic ethylene sulfide polymers have been developed which have very good solvent resistance, as well as high temperature melting properties that make them exceptionally well adapted for use as engineering plastics in the injection or extrusion molding of a wide variety of useful articles such as pipes, films, filaments, rods, bars, gears, pumps and the like. Polymers of this type are disclosed, for example, in U.S. Pat. 3,365,431. As disclosed in this patent, the polymers may be homopolymers of ethylene sulfide or interpolymers of ethylene sulfide with minor amounts of a wide variety of comonomers that are co-polymerizable with ethylene sulfide. The homopolymers in particular are characterized by the fact that, in addition to excellent solvent and chemical resistance, they have high heat distortion temperatures, low water absorption properties, extremely low deformation under load and excellent dimensional stability.

In spite of their excellent molding and physical properties, the development of such ethylene sulfide polymers has been retarded to some extent by their tendency to undergo degradation either during or subsequent to molding. Thus the relatively vigorous molding conditions, i.e., time and temperature, usually employed when molding such materials can lead to thermal degradation as evidenced by discoloration, lowering of the melting point and increase of the melt index of the polymer. Also oxidative degradation may occur either during or after molding.

Since such degradation significantly decreases the value of molded products produced from these polymers, efforts have been made to stabilize the polymers and various stabilizing agents have been suggested for incorporation in the polymers to inhibit degradation thereof. Thus Canadian Pat. 736,026 discloses that degradation of ethylene sulfide polymers may be reduced by incorporating therein a small amount of any of a rather wide variety of organic nitrogen-containing compounds. These include, for example, amides containing 5 or more carbon atoms; monofunctional aliphatic amines containing 8 or more carbon atoms; hydroxy-containing amines; alkylene, arylene, alkarylene and aralkylene polyamines having a variety of end groups, adducts of polyamines and alkylene oxides and compounds containing nitrogen in a ring structure. It has further been proposed in Larsen Pat. No. 3,519,598 that nitrogen-containing compounds of the foregoing and other types be used in combination with certain Group II–B metal-containing compounds as stabilizers for ethylene sulfide polymers.

While these previously proposed stabilizing agents are effective in varying degrees in reducing the degradation of ethylene sulfide polymers, they do not inhibit degradation, particularly oxidative degradation, to as great a degree as would be desirable. It is accordingly an object of the present invention to provide a novel and improved method for stabilizing moldable, high molecular weight, ethylene sulfide polymers. It is another object of the invention to provide a stabilized moldable ethylene sulfide polymer having improved resistance to degradation, especially oxidative degradation. Other objects of the invention will be in part obvious and in part pointed out hereafter.

The objects of the present invention are achieved, in general, by utilizing a stabilizing agent selected from finely divided elemental copper and copper salts that are essentially insoluble in and inert toward ethylene sulfide monomer. Copper salts that have been found effective include cuprous potassium cyanide, cupric hydroxide, cupric carbonate, cupric sulfate, cuprous cyanide and copper stearate. In accordance with the process of the invention a small amount of the stabilizing agent is incorporated in the polymerization reaction mixture prior to polymerization of the ethylene sulfide. This is in contrast to the stabilization procedures referred to above wherein the stabilizer is incorporated in the polymer after it has been formed. In the present process the amount of stabilizing agent preferably used is about 0.5 to 5% by weight of the ethylene sulfide monomer to be polymerized.

In general, the present stabilizing agents can be used in conjunction with any of the known processes for preparing high molecular weight ethylene sulfide polymers. A preferred process of this type is disclosed in U.S. Pat. 3,365,429 wherein polymerization of ethylene sulfide is effected in the presence of a composite catalyst comprising a complex compound of a Group II–B metal alkyl and a second component having an active hydrogen atom. Of the composite catalysts disclosed in U.S. Pat. 3,365,429, particularly good results have been obtained when using the diethylzinc/water catalyst disclosed in that patent.

Ethylene sulfide polymerization processes using other types of catalysts and in which the present stabilizing agents may be used are disclosed in U.S. Pat. 3,337,513, cadmium compounds such as the hydroxides, sulfides, silicates, oxides, acetates, sulfates and carbonates; U.S. Pat. 3,359,248, zinc or mercury compound such as the peroxides, sulfides, chromites, adipates, oxalates, oxides, hydroxides and carbonates; U.S. Pat. 3,472,821, carbonates of zinc, manganese, lead, cadmium, cobalt and nickel; and U.S. Pat. 3,300,454, an extensive group of metal oxides.

In general, the polymerization process of the invention is carried out in the manner previously disclosed in the patents referred to above, except for the fact that the stabilizing agents disclosed herein are incorporated in the reaction mixture. Thus a polymerization mixture is prepared comprising ethylene sulfide monomer, either with or without comonomers of the type disclosed in U.S. Pat. 3,365,-431, a polymerization catalyst which may be present to the extent of say 0.05 to 3% by weight and a small amount, say 0.5 to 5% by weight, based on the weight of monomers, of finely divided elemental copper or a copper salt that is essentially insoluble in and inert toward the ethylene sulfide monomer. The polymerization may be carried out in bulk or in the presence of an inert solvent such as those disclosed in U.S. Pat. 3,365,429. The polymerization reaction can be carried out over a relatively wide temperature range say −20° C. to 150° C. for a period of a few minutes to 48 hours, depending on the temperature and nature of the components of the polymerization reaction mixture.

The polymers produced when proceeding as described above tend to be fine particle size, fluffy powders which are somewhat difficult to handle and manipulate during molding. Moldable polymers of a more granular nature and having better handling properties may be produced using a "seed catalyst" technique. These granular powders may also be stabilized with the stabilizers of the present invention. In a typical "seed catalyst" procedure the organometallic compound/co-catalyst material (in about a 1:1 mol ratio) is used to polymerize the episulfide monomer charge in solution at room temperature. About 0.05 to 10 mol percent catalyst is used based on the monomer charge. The solvents used may be, for example, tetrahydrofuran, petroleum ether, benzene or toluene. The conversion is proportional to the amount of catalyst used and the polymer product contains, combined therewith, all the catalyst initially charged. The fluffy polymer product is then isolated and dried.

This product is then compacted to form dense cakes and the cakes are ground to form particles of less than 20-mesh in size. This granulated polymer product, which contains the original catalyst charge in the form, it is believed, of an activated zinc compound such as zinc oxide, is then used as a "seed catalyst" with which to polymerize ethylene sulfide alone or with other monomers copolymerizable therewith to form granular powders. About 1 to 5% by weight of the seed catalyst is used based on the monomer charge. The seed catalyst based polymerization is typically conducted at elevated temperatures of about 176±5° F. for about one to three hours. The yields of the granular polymer obtained are about 80–100%. The seed catalyst polymer and the polymer produced therewith have essentially the same chemical characteristics and they are used in combination in subsequent molding operations without separating one from the other.

The effectiveness of the present stabilizing agents was primarily evaluated in terms of infra-red absorption spectra determined on the stabilized products. Samples of the product polymers were prepared for infra-red analysis as follows: Three to five gram samples of the polymer were placed between two 6" x 6" aluminum sheets and pressed between platens heated to 450° F. at a pressure of 20,000 to 25,000 p.s.i. for 15 seconds or until the material began to melt. The resulting films, which were about 0.005 to 0.007 inch in thickness, were mounted between pieces of cardboard having aligned holes of about 1" in diameter therein to provide an exposed disc portion of the molded film for infra-red spectrum determination.

It was found in the case of control specimens that oxidative attack on the polymer was evidenced by a substantial peak in the absorption region lying between 1700 and 1750 cm.$^{-1}$ and particularly in the neighborhood of 1715 cm.$^{-1}$. Hence this peak was used as a criterion for evaluating the present stabilizing agents.

Referring to the accompanying drawings, FIG. 1 represents the pertinent portion of the infra-red absorption spectrum of a control polymer, i.e., a polymer prepared without using the stabilizing agents of the present invention and FIGS. 2 to 8 represent corresponding portions of the absorption spectra of polymers prepared as described in Examples 1 to 7, respectively, described below. The solid line in each figure represents the spectrum of the polymer as initially prepared and the dotted line is the spectrum obtained after the sample had been aged by passage of a hot air stream thereover at 150° C. for 16 hours. It should be noted that the relative positions of the two curves on each graph have no significance, since the recording pen of the measuring instrument is arbitrarily positioned on the record paper at the start of each scan. The signicant factor is the variation in the absorbance of a particular polymer sample as the instrument scans the wave length region of interest.

In some cases melt viscosity values were determined a further means of evaluating the stabilized polymers. These melt index determinations were made with a capillary flow plastometer as specified in ASTM Method D1238–57T and as sold by F. F. Slocomb Corporation of Wilmington, Del. In accordance with this method, the reservoir of the instrument was preheated and maintained at a specified temperature and was then charged with about 8 grams of sample in about three minutes. A 5 kilogram weight was then placed on top of the charge by means of a ram to compact the sample and allowed to remain there for a period of time, which, in combination with the charging time, totaled about 6 minutes. After this time interval, it was replaced with a 2.160 kilogram weight. The plug was removed from the flow orifice and the amount of sample which flowed through the orifice in each minute interval thereafter was collected and accurately weighed to the nearest milligram. A control sample of ethylene sulfide polymer was tested at the simulated test temperatures as above to gain comparative data. In the examples given below the "total flow time" refers to the total number of minutes required for the polymer sample to flow out of the plastometer.

In order to further point out the nature of the present process and product, the following examples are given which are intended to illustrate embodiments of the invention and not to define its scope.

EXAMPLE I

A quantity of toluene (400 mls.) was dried over CaH$_2$ and transferred by siphon to a 30 oz. polymerization bottle. The bottle was washed previously with soap and water, rinsed thoroughly with tap water, de-ionized water and acetone, and baked in an oven at 150° C. for 16 hours (overnight). One gram of cuprous potassium cyanide was placed in the bottle with the solvent. The bottle was thoroughly flushed with helium and the mouth covered with aluminum foil. Thereafter 1.46 mls. of a benzene solution of diethylzinc containing 1.11 millimoles of diethylzinc was injected by syringe into the bottle through the aluminum foil. The contents of the bottle were manually shaken, and allowed to stand for approximately 5 minutes, after which 0.2 ml. of a 10% solution of water in tetrahydrofuran (1.11 millimoles of H$_2$O) was added to the bottle, also by syringe. The contents were once again shaken and allowed to stand for a few minutes. Freshly distilled ethylene sulfide monomer (100 mls.) was then poured into the bottle which was once again flushed with helium and capped.

The polymerization was carried out at 80° C. for 2 hours in a polymerization bath. At the end of this period the polymer was removed from the bottle and dried in a vacuum oven at 60° C. A yield of 95.2 grams, i.e., about 95% based on the weight of monomer, was obtained having an approximate molecular weight of 560,000.

A sample of the polymer was prepared for infra-red analysis as described above and infra-red absorption spectra obtained thereon both before and after aging with the results shown in FIG. 2 of the drawing. A comparison of the spectra of FIGS. 1 and 2 of the drawing, and more particularly the spectra obtained after aging at 150° C. for 16 hours, shows that in the case of the control sample of FIG. 1, which contained no stabilizing additive, a large peak occurred in the neighborhood of 1715 cm.$^{-1}$, whereas as shown in FIG. 2, the peak at 1715 cm.$^{-1}$ obtained when using the polymer of the present example was much smaller, thus indicating that the stability of the polymer in respect to oxidative degradation was substantially greater.

A melt viscosity determination was made on the polymer of this example at 220° C. and a total flow time of 26.5 minutes obtained. This compared with a total flow time of 10.5 minutes obtained under the same conditions with a similar polymer containing no stabilizing additive.

EXAMPLE II

Using essentially the same polymerization procedure as in Example I, 100 mls. of ethylene sulfide were polymerized in the presence of 400 mls. of toluene, 250 mgs. (2.57 millimoles) of cupric hydroxide and 1.71 mls. of catalyst solution containing 1.11 millimoles of diethylzinc. In this case water was omitted as a co-catalyst. The yields of ethylene sulfide polymer obtained was 77% and the polymer had an approximate molecular weight of 415,000.

A portion of the polymer obtained was subjected to infra-red absorption analysis with the results shown in FIG. 3 of the drawing. Reference to FIG. 3 shows that no significant peak was obtained at 1715 cm.$^{-1}$ either before or after aging when using cupric hydroxide as a stabilizing agent.

A melt viscosity determination was made on another portion of this polymer at 220° C. and a total flow time of 14.5 minutes was obtained as compared with a total flow time of 10.5 minutes for a similar polymer containing no stabilizing additive.

EXAMPLE III

Using the same polymerization procedure as in Example I, 100 mls. of ethylene sulfide were polymerized in the presence of 400 mls. of toluene, 2 gms. of copper metal in the form of purified electrolytic dust, 1.40 mls. of diethylzinc catalyst solution containing 1.11 millimoles of diethylzinc and 0.2 ml. (1.11 millimoles $H_2O$) of 10% $H_2O$ in tetrahydrofuran.

The yield of ethylene sulfide polymer obtained was 88% and the polymer had an approximate molecular weight of 340,000.

A portion of the polymer thus obtained was subjected to infra-red absorption analysis with the results shown in FIG. 4 of the drawing. A comparison of FIGS. 1 and 4 shows that while the polymer obtained when using copper dust as a stabilizing additive exhibited, after aging, a small peak at about 1715 cm.$^{-1}$, the peak was substantially smaller than that exhibited, under the same conditions, with the control polymer of Example I.

A melt viscosity determination was made on another portion of this polymer at 220° C. and a total flow time of 20.3 minutes was obtained.

EXAMPLE IV

The procedure of Example I was followed except that the cuprous potassium cyanide was replaced by two grams of cupric carbonate. The polymer obtained had an approximate molecular weight of 220,000.

The infra-red spectrum of this polymer is shown in FIG. 5 of the drawings. As indicated in FIG. 5, this polymer exhibited no significant peak at 1715 cm.$^{-1}$, either before or after aging.

EXAMPLE V

The procedure of Example I was followed except that the cuprous potassium cyanide was replaced by 2 grams of cupric sulfate. The polymer obtained had an approximate molecular weight of 208,000.

The infra-red spectrum of this polymer is shown in FIG. 6 of the drawings. As indicated in FIG. 6, this polymer exhibited no significant peak at 1715 cm.$^{-1}$, either before or after aging.

EXAMPLE VI

The procedure of Example I was followed except that the cuprous potassium cyanide was replaced by 2 grams of cuprous cyanide. The polymer obtained had an approximate molecular weight of 235,000.

The infra-red spectrum of this polymer is shown in FIG. 7 of the drawings. As indicated in FIG. 7, this polymer exhibited no significant peak at 1715 cm.$^{-1}$, either before or after aging.

EXAMPLE VII

The procedure of Example I was followed except that the cuprous potassium cyanide was replaced by 2 grams of copper stearate. The polymer obtained had an approximate molecular weight of 215,000.

The infra-red spectrum of this polymer is shown in FIG. 8 of the drawings. As indicated in FIG. 8, while this polymer exhibited a small peak at 1715 cm.$^{-1}$, the peak was significantly less than the peak exhibited by the control polymer as shown in FIG. 1.

EXAMPLE VIII

This example illustrates the use of a seed catalyst as described above. Using essentially the same polymerization procedure as in Example I, 50 mls. of ethylene sulfide was polymerized in the presence of 400 mls. of toluene, 12.5 grams cuprous potassium cyanide, 16 mls. of diethylzinc solution containing 13.87 millimoles of diethylzinc and 0.25 ml. (13.87 millimoles) of water. The yield of polymer was 62 grams.

The resulting polymer was compacted and granulated as described above to form particles of less than 20 mesh size. Five grams of the seed catalyst as thus prepared was used to polymerize 100 mls. of ethylene sulfide in the presence of 400 mls. of toluene using the procedure of Example I. A 70% yield of ethylene sulfide polymer was obtained. A melt viscosity determination was made on the resulting polymer at 220° C. and a total flow time of 21.8 minutes was obtained. The polymer had an approximate molecular weight of 580,000.

As indicated above, the stabilizing additives of the present invention are primarily useful in inhibiting oxidative degradation of the polymer. It has been found that at least in some instances the overall stability of the polymers can be improved by adding to the polymers prepared as described in the foregoing examples stabilizing agents that are known to be effective in inhibiting thermal degradation of ethylene sulfide polymer. Thus nitrogen-containing compounds of the type described in the introductory portion of the present specification, e.g., those disclosed in Canadian Pat. 736,026 and Larsen Pat. No. 3,519,598 can often be advantageously incorporated in polymers stabilized with the additives of the present invention.

The effect of adding such nitrogen-containing stabilizers to the present polymers may be illustrated as follows: Portions of the polymers of Examples 1, 2 and 3 above were further stabilized by incorporating in the polymers a combination stabilizer comprising a partially hydrolyzed zinc chloride and a bis-aminophenyl ether of the formula

$(H_2NCH_2CH_2NHCH_2C_6H_4)_2O$

1% by weight of each of the stabilizing components was used. Melt viscosity determinations were made at 235° C. on the supplementally stabilized polymers and in each case the total flow time was greater than 30 minutes.

Polymers stabilized by the present process may also contain other adjuvant materials commonly used in formulating molding compositions, such as pigments, UV stabilizers, fillers, flame retarding agents, nucleating agents and lubricants.

I claim:

1. In a process for producing a solid, high molecular weight, thermoplastic ethylene sulfide polymer by the catalytic polymerization of a monomeric material consisting essentially of ethylene sulfide monomer, the improvement which comprises incorporating in the polymerization reaction mixture prior to polymerization a small amount of stabilizer consisting essentially of a stabilizing agent selected from finely divided elemental copper and copper salts that are essentially insoluble in and non-reactive with the ethylene sulfide monomer to produce a polymer of improved stability against oxidative degradation.

2. A process according to claim 1 wherein the stabilizing agent is elemental copper.

3. A process according to claim 1 wherein the stabilizing agent is a copper salt.

4. A process according to claim 3 wherein the copper salt is cuprous potassium cyanide.

5. A process according to claim 3 wherein the copper salt is cupric hydroxide.

6. A process according to claim 3 wherein the copper salt is cupric carbonate.

7. A process according to claim 3 wherein the copper salt is cupric sulfate.

8. A process according to claim 3 wherein the copper salt is cuprous cyanide.

9. A process according to claim 3 wherein the copper salt is copper stearate.

10. In a process for producing a solid high molecular weight, thermoplastic ethylene sulfide polymer of the type in which a seed catalyst is first prepared by polymerizing ethylene sulfide monomer in the presence of an ethylene sulfide polymerization catalyst to form a fluffy polymer, compacting and granulating the fluffy polymer formed, and using the granulated product as a catalyst to polymerize ethylene sulfide monomer to form a moldable, high molecular weight thermoplastic ethylene sulfide polymer, the improvement which comprises incorporating in the polymerization reaction mixture used to form the seed catalyst a small amount of stabilizer consisting essentially of a stabilizing agent selected from finely divided elemental copper and copper salts that are essentially insoluble in and non-reactive with the ethylene sulfide monomer to produce a polymer of improved stability against oxidative degradation.

11. A process according to claim 10 wherein the stabilizing agent is elemental copper.

12. A process according to claim 10 wherein the stabilizing agent is a copper salt.

13. A process according to claim 10 wherein the copper salt is cuprous potassium cyanide.

14. A process according to claim 1 wherein the stabilizing agent comprises from 0.5 to 5% by weight, based on the weight of monomer material.

References Cited

UNITED STATES PATENTS

| | | | |
|---|---|---|---|
| 3,519,598 | 7/1970 | Larsen | 260—79.7 |
| 3,489,702 | 1/1970 | Abramoff | 260—18 |
| 3,402,134 | 9/1968 | Berenbaum | 260—45.75 |

FOREIGN PATENTS

| | | | |
|---|---|---|---|
| 932,066 | 7/1963 | Great Britain | 260—45.75 |

DONALD E. CZAJA, Primary Examiner

E. C. RZUCIDLO, Assistant Examiner

U.S. Cl. X.R.

260—45.75 C, 79, 79.7